United States Patent [19]

Provost et al.

[11] Patent Number: 5,360,314
[45] Date of Patent: Nov. 1, 1994

[54] METHOD AND APPARATUS FOR REMOVING FLASH AND GATES FROM GOLF BALLS

[75] Inventors: Richard H. Provost, Brimfield, Mass.; Robert P. Luben, Granby, Conn.

[73] Assignee: Lisco, Inc., Del.

[21] Appl. No.: 749,397

[22] Filed: Aug. 23, 1991

[51] Int. Cl.⁵ .............................. B65G 47/24
[52] U.S. Cl. .................... 414/755; 198/380; 198/395; 414/786
[58] Field of Search ........ 198/380, 394, 395; 406/12, 32, 23; 414/755, 786

[56] References Cited

U.S. PATENT DOCUMENTS

| | | | |
|---|---|---|---|
| 2,308,038 | 1/1943 | Ashlock, Jr. | 198/380 |
| 2,935,176 | 5/1960 | Lorenzen | 198/380 |
| 3,200,968 | 8/1965 | Gaddini | 198/380 X |
| 3,797,639 | 3/1974 | Smith | 198/394 |

FOREIGN PATENT DOCUMENTS

| | | | |
|---|---|---|---|
| 53-23480 | 3/1978 | Japan | 198/395 |
| 145918 | 11/1980 | Japan | 198/394 |

Primary Examiner—Michael S. Huppert
Assistant Examiner—Janice Krizek

[57] ABSTRACT

A method and apparatus to automatically orient golf balls for milling comprising a plurality of aligned cups. Each cup has a generally hemispherical recess to receive a golf ball. A first component is provided to move the golf balls from cup to cup. A second component is provided to detect the height of the golf ball in the cup as a function of whether excess circumferential material is in the cup or resting on the upper surface of the cup. A third component is provided to initiate blasts of air when excess material is in the recess. A fourth component is provided to terminate the blasts of air at subsequent cups if there is no excess material in the recess.

18 Claims, 8 Drawing Sheets

METHOD AND APPARATUS FOR REMOVING FLASH AND GATES FROM GOLF BALLS

BACKGROUND OF THE INVENTION

1. Field of the Invention

The present invention relates to an improved method and apparatus for removing flash from golf balls, and more particularly, to automatically aligning the flash and gates of a golf ball in a horizontal plane whereby such flash may be removed automatically by a milling machine.

2. Description of the Background Art

Various methods and apparatus have been devised for removing the flash from golf balls which is formed during the fabrication process. The flash and gates are formed when two hemispherical halves of the golf ball are injection molded or otherwise coupled together about a core. The flash represents the horizontal equator of the ball and contains excess material extending radially from the ball. Although various machines, normally abrading machines, are utilized to remove such flash prior to sale and use, it has been necessary in the past to manually position the golf ball with respect to the milling machine prior to milling.

Prior art machinery similar to that disclosed and claimed herein include U.S. Pat. Nos. 3,561,908 to Reinfeld; 4,501,715 to Barfield; 4,779,387 to Reid et al.; and 4,894,958 to Takasaki.

Reinfeld includes a rotatable ball support member, a rotatable ball engaging member positionable directly above the ball support member and means for driving the ball engaging member. Other means position the ball engaging member for movement to and from engagement with the ball on the ball support member, a cutter means is provided and a support means carries the cutter means and is pivotally positioned so that control means connecting to the support means can move it to bring the cutter means into and out of engagement with the ball on the ball support member for trimming mold flash, or rind therefrom.

Barfield relates to a mold and method of compression molding shell half covers around a core to forth golf balls. Opposed dies are pressed together such that some of the material trapped between the approaching dies is forced back into the mold to compensate for shrinkage and the remainder is forced outside of the die cavities where it can be drained off.

Reid et al. relate to an automatic buffing machine and method for automatically buffing a golf ball. The golf ball is oriented such that the flash ring is in a predetermined plane and then the flash ring is removed. The golf ball matrix is preferably utilized to orient the golf ball and both cutting and sanding are preferably used to remove the flash ring.

Takasaki relates to an apparatus for scraping off burrs at the resin outer layer of a golf ball. According to this patent, even if some errors exist in the diameter of golf balls of resin outer layer, only burrs can be scraped off automatically at high efficiency without impairing the degree of true circle of golf balls and without generating deformation of golf balls.

The above mentioned patents disclose methods and apparatus for specific applications. None of such machines and methods, however, are particularly adapted for automatically positioning flash lines of golf balls during the manufacturing process.

Therefore, it is an object of the present invention to provide an improved method and apparatus to automatically orient a golf ball for milling comprising a plurality of aligned cups, each cup having a generally hemispherical recess to receive a golf ball; means to move the golf balls from cup to cup; means to detect the height of the golf ball in the cup as a function of whether excess circumferential material is in the cup or resting on the upper surface of the cup; means to initiate blasts of air when excess material is in the recess; and means to terminate the jets of air at subsequent cups if there is no excess material in the recess.

Another object of the present invention is to automatically position golf balls with their flash lines in a horizontal plane.

It is a further object of the present invention to continuously and automatically position golf balls for flash line removal.

It is a further object of the present invention to use pulsed blasts of air in sequential steps to reposition golf balls until the equator thereof is in a horizontal plane.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

The present invention is defined by the appended claims with the specific embodiment shown in the attached drawings. For the purpose of summarizing this invention, this invention may be incorporated into apparatus for seating balls with excess material around their equator comprising a block with a generally hemispherical recess facing upwardly, the recess being of a diameter substantially the same as that of a golf ball and being of a height slightly less than the radius of the golf ball and an aperture extending through the walls to provide a jet of air to the recess with a golf ball thereabove to thereby effect a fluttering of the golf ball when the air of the jet contacts the excess material in the recess.

The invention may also be incorporated into apparatus to automatically orient a golf ball for milling comprising a plurality of aligned cups, each cup having a generally hemispherical recess to receive a golf ball; means to move the golf balls from cup to cup; means to detect the height of the golf ball in the cup as a function of whether excess circumferential material is in the cup or resting on the upper surface of the cup; means to initiate blasts of air when excess material is in the recess; and means to terminate the jets of air at subsequent cups if there is no excess material in the recess.

Laslty, the invention may be incorporated into a method to automatically orient a golf ball for milling comprising providing a plurality of aligned cups, each cup having a generally hemispherical recess to receive a golf ball; moving the golf balls from cup to cup; detecting the height of the golf ball in the cup as a function of whether excess circumferential material is in the cup or resting on the upper surface of the cup; initiating blasts of air when excess material is in the recess; and terminating the jets of air at subsequent cups if there is no excess material in the recess.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carting out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Overview

Figure 1:
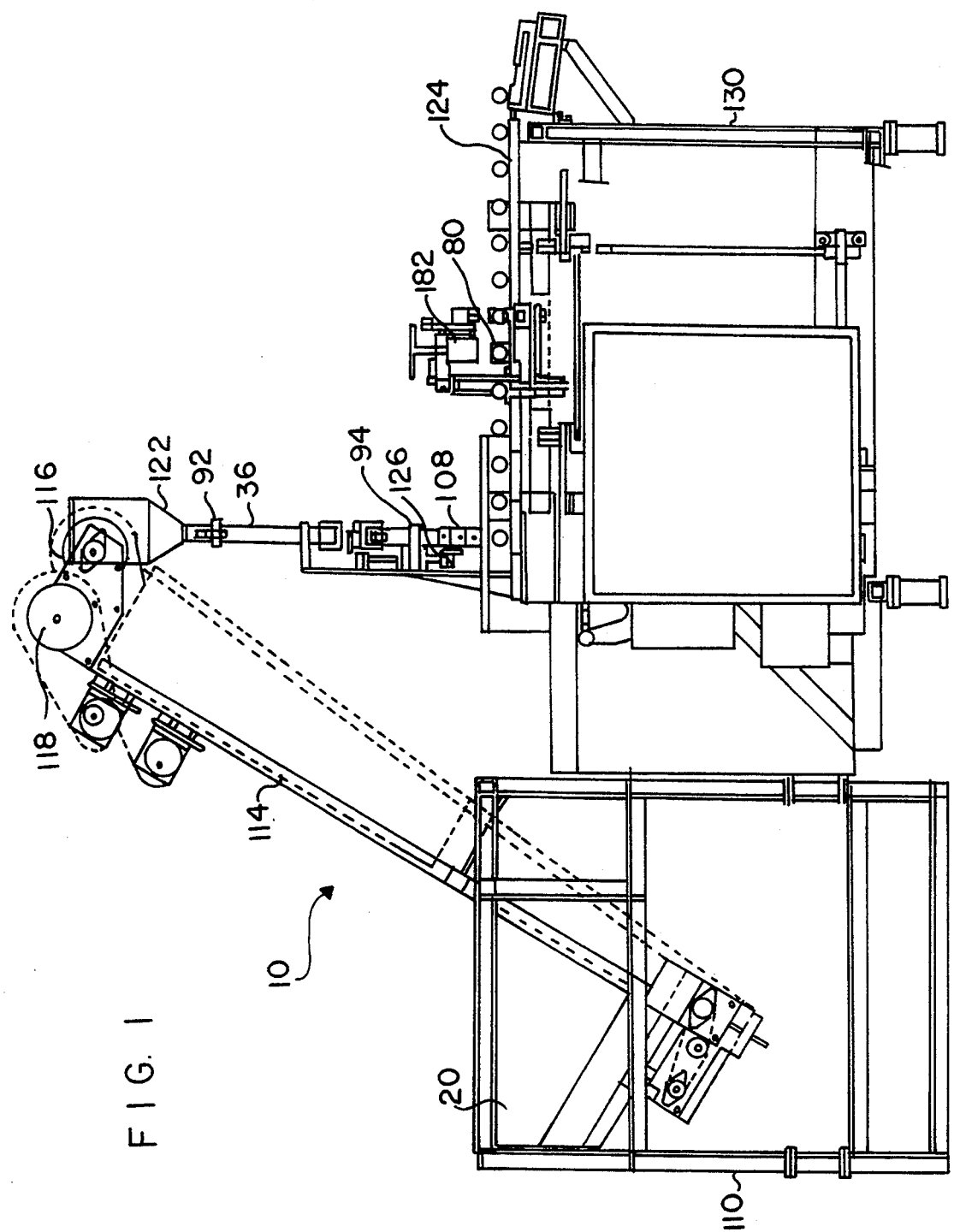
FIG. 1 is a side elevational view of a machine constructed in accordance with the principles of the present invention.
Figure 2:
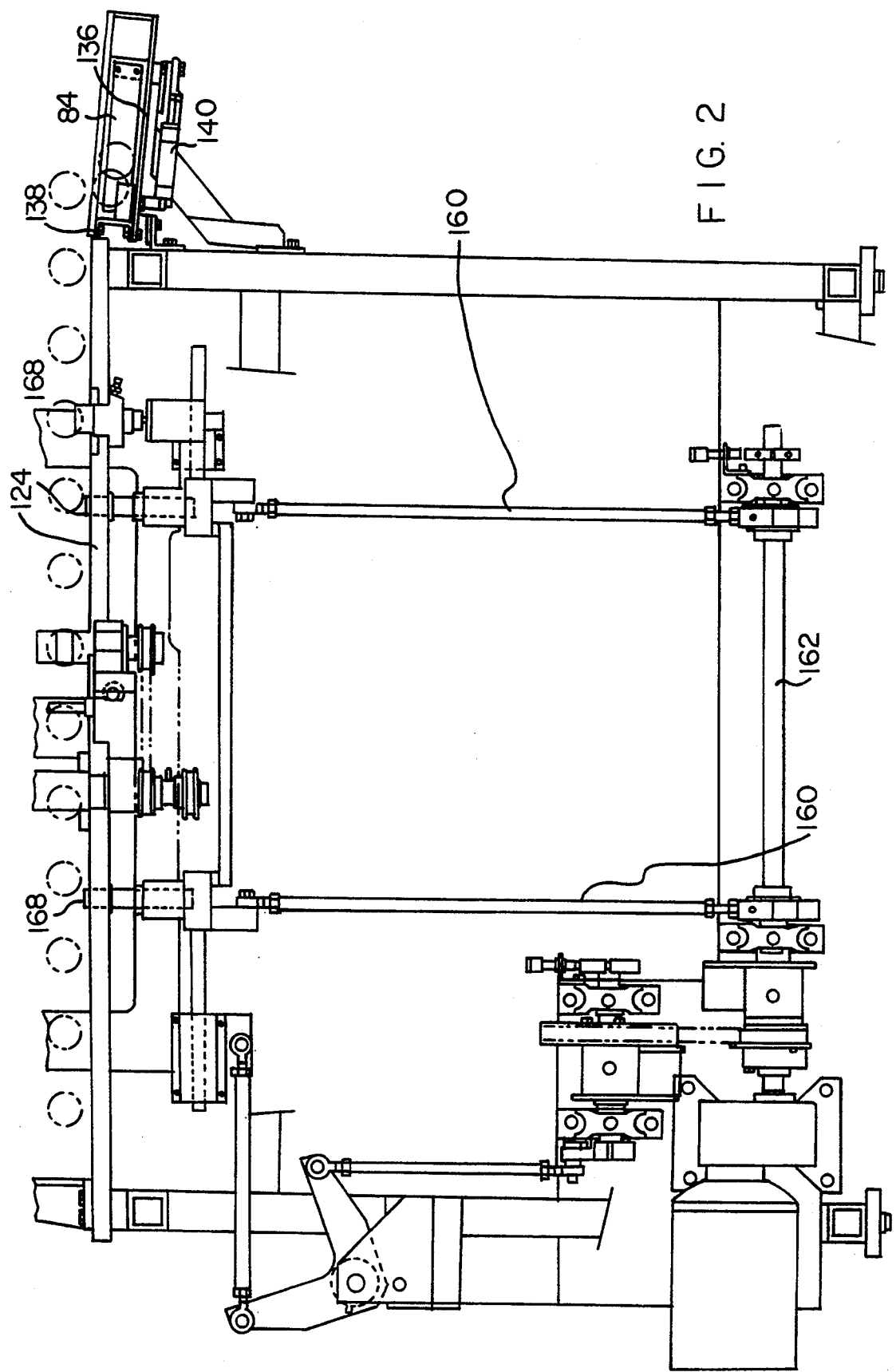
FIG. 2 is a side elevational view of the central portions of the worktable slightly enlarged.

Shown in the various Figures is a machine 10 which continuously and automatically positions and removes flash lines 12 from the equators of golf balls 16. The manual loading operation of the golf balls is thereby eliminated with the benefit of increased speed and efficiency.

The machine 10 and process start when the balls 16 are dumped into the hopper 20 after injection molding. The balls 16 are coupled up on parallel tracks 22 and 24 on each side of an elevator 26. Each track feeds balls 16 to one side 30 and 32 of the conveyor portion 34 of the machine 10. After being fed from the hopper 20, the balls are dropped into the parallel tubes 36.

Figure 11:
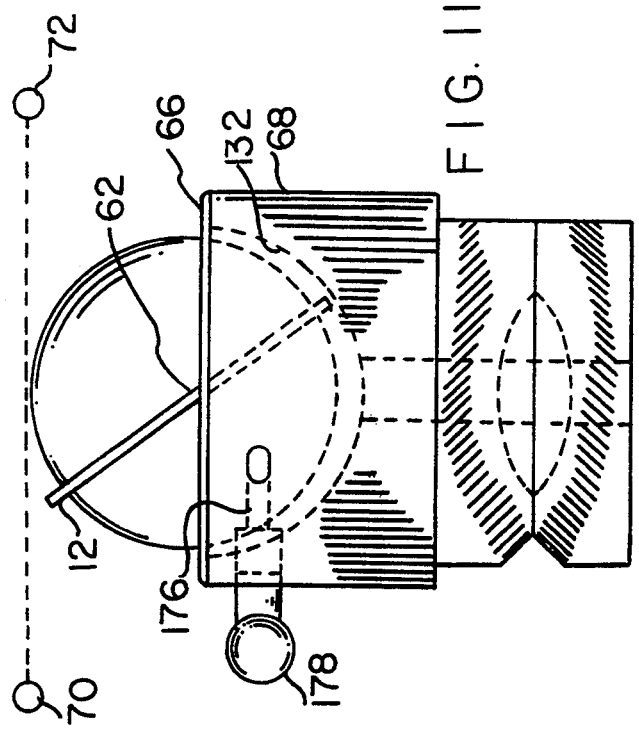
FIGS. 11 and 12 are elevational views of the cup with a ball shown in the improper and proper orientations.

Travel of the balls on each track is independently controlled automatically by separate photoelectric sensors. The balls fall by gravity down the tubes 36 to the points where they are dropped into the first cups 40 and 42. The first pair of cups and the following four pairs of cups 44, 46, 48, 50, 52, 54, 56 and 58 function to orient the balls with their equators 62 oriented horizontally within their flash and gate projections or other material on the upper rims 66 of the cups 68. At each of the first five cups, a Jet of air acts to force the ball to rotate. If a ball is oriented to position its flash or gate projections in the horizontal plane, a photoelectric detector 70 and 72 senses the fact that it is in the proper position (FIG. 12) and shuts down various orienting actions on the subsequent stations. After the fifth station there is a lower vacuum from beneath the ball for the final test of orientation. In order to do this a vacuum is created beneath the ball through channel 76. If the ball is properly oriented in the cup the vacuum is high enough to tell that the ball it is properly oriented. If proper orientation is detected, the ball will then be conveyed to the seventh station where it is clamped in the cup and moved outwardly to the milling cutter. If the ball is not oriented properly at a prior station (note FIG. 11) the jets of air are effected at the subsequent stations.

At the milling station, the balls 16 are fed to the milling cutter 80 where they are spun so that the rotation of the ball with flash and gates against the milling cutter spinning at high speeds will cause the removal of the flash and gates away from the circumferential girth of the ball. The milling element is a carbide cutter. After complete milling, the ball is returned to the row of cups by its rotating support mechanism 82 and moved through subsequent stations as it is transported down the line of cups in a path of travel. At the last station the balls are dropped to a diverter device 84. If the ball has not been milled properly, it is diverted into a separate container 86 centrally located. If properly milled it is diverted into a side track 88. There is a track 88 for each side of the machine 10.

An overview of the controls and safety sensors starts with a high level sensor 92. This provides balls from going any higher in each vertical tube 36. At the lower end of each tube is a lower sensor 94 which controls the low level. Level sensors are needed to insure a predetermined level of balls in the tubes at any given time. These control the drives of the elevators 22 and 24 to each individual tube 36.

The next sensors are the photoelectric lights 70 and detectors 72 at each cup 68 to determine the heights of each ball in each orientation station, the first five pairs of cups. If ball 16 is in fact oriented properly with its flash and gate projections in a horizontal plane, it drops down in the cup to a lower orientation allowing the beam of light to be seen by its detector. If a ball is not oriented properly, the flash and gate projections hold it higher in the cup so that the light does not shine on the sensor. Compare FIGS. 11 and 12. Air blasts will therefore continue at the subsequent station or stations until proper orientation is achieved and detected.

Further down the feed path there is the vacuum orientation detection stations 96 and 98, station 7. At this station the vacuum is pulled on the ball from below through line 76. If the ball is oriented properly, the vacuum is high and the ball is identified as being oriented properly. The flash and gates will then be milled from the ball. If the ball is not oriented properly, the vacuum is low and the ball is detected as not being oriented properly, and it will stay in line and not be milled. Such unmilled balls will exit the machine and go into the center container 86 for return to the hopper 20 and another try at orientation.

The last item of sensing is a photoelectric sensor. Sensors 102 are at each end of the row of cups. At the other end of the rows are the associated light sources 104 at the input end. This determines if any balls have fallen during the transfer from one station to another. When such occurs the machine is entirely stopped for proper corrective action.

Input

Input to the machine is effected by a hopper 20, elevator 26, feed tubes 36 and escapement device 108. The hopper 20 is an open faced container supported on a frame structure 110. Located at the forward wall of the hopper is the lower portion of the elevator 26. The elevator has two parallel sides and one central wall to create a pair of paths for elevating balls in the hopper and for feeding them upwardly to the upper end of the conveyors into the top of the tubes 36. The conveyors are a pair of parallel, side by side, conveyors consisting of nylon flights secured to endless chains 114 trained around end sprockets 116, the upper sprocket of which is power driven by a motor 118. A separate motor exists for each chain. Each belt has on its exterior surface a series of flights extending perpendicular to the surface of the chain and secured thereto as by fasteners. The flights are separated from each other by a distance slightly greater than the diameter of the ball. The width of each flight is also slightly greater than the diameter of a ball. In this manner each flight will lift but one ball from the hopper to the top of the tubes. The hopper has side walls angling toward the lowermost portion to ensure that all balls in the hopper are conveyed upwardly. Loading of the hopper conveyor may be done manually or through an automatic delivery system.

When the balls are elevated to the upper end of the elevator, the chain rotates around the upper sprocket to drop the balls from the flights into the tubes 36. There is one tube for each of the side by side elevators. A funnel-like receptacle 122 receives balls sequentially and holds them in columns above the first cups 40 and 42 on the table 124. The tube is an elongated tube adapted to hold about 36 golf balls. The lower portion of the tube is the escapement 108. The escapement is a supplemental tube, axially aligned with an upper tube and reciprocable by an air cylinder 126 between an elevated loading position and a lower delivery position. Three balls are normally located in the escapement. The balls in the escapement are held by fingers to feed off downwardly one ball and one ball only when the escapement is reciprocated to the lowermost position immediately above the first cup for the delivery of that ball to the cup for subsequent orientation and removal of the flash and gates.

An air cylinder 126 effects the reciprocation of the escapement tube 108 while the fingers are actuated by air cylinders. The air cylinder solenoids are energized by the main control assembly during the continuous and automatic operation of the machine.

In addition to the foregoing, a pair of light sensors are also provided in association with the fixed portion of the delivery tube. An upper sensor 92 determines the high level of balls whereas the lower sensor 94 determines the low level of balls. In the event that the number of balls in the delivery tube falls below the level of the lowermost sensor, such is sensed and the machine is totally shut down to allow the quantity of balls in the hopper to be replenished or the error which caused the depletion of balls to be corrected. The uppermost sensor 92 determines the high level of balls in the tube. In the event that the number of balls is sensed at the upper sensor, such is determined to be a full condition and the motor 118 to the elevator for that side of the machine is shut down until the number of balls in the tube is depleted to the lower level. The speed of the movement of balls through the machine, both through the escapement tube 108 as well as the elevator 26, are coordinated for a continuous and automatic cycle of operation.

Worktable

The main part of the machine is located on the worktable 124. The worktable is a planar surface supported from beneath by a frame structure 130. Located on the worktable are a plurality of ball supporting cups 68. There are 24 cups, 12 along the line of ball feed and 2 columns thereof in side by side relationship. Each cup 68 represents a stopping point on the progress of a ball from input at the escapement to the diverter of the machine. Each cup has a generally hemispherical upper recess 132 to receive the lower half of a golf ball.

If the golf ball is oriented properly with its flash and gates in a horizontal plane resting on the upper horizontal surface 66 of the cup, then the ball is properly oriented for being milled. In the event that the ball is not properly oriented, the flash and gate projections will be within the cup and therefore the ball will be at a higher elevational orientation for being detected by light sensors 70, 72. When the higher orientation of the ball is detected due to the improper seating of the ball in the cup, the sequence will be such as to effect a pulsed air jet at the following station. This is in an attempt to make the ball flutter and readjust its orientation so that it will then become properly seated within the cup. Such height sensing is tried four times for each ball in sequential cups.

At the fifth station, a vacuum is applied from beneath the ball by a source of vacuum through line 76 to determine if proper orientation has been attained. If properly oriented, a high vacuum will be created and detected and the ball will then be milled. If, however, the ball is improperly seated, such will be detected. As a result, the programming is such that upon reaching the output end of the machine, such oriented balls will be placed into a separate container 84 for return to the hopper 20 for recycling in the system.

The end of the table includes a downwardly angled shelf 136 with two diverter plates 84, one for each line of cups. Each diverter plate is oriented to pivot about a generally vertical axis 138 for movement. Its normal position is to allow the ball to fall exteriorly of the machine into a track 86 for finished golf balls. These are the balls which have been properly milled to remove their flash and gate projections. The diverter plates are also movable to an opposite position to allow unmilled balls requiring recycling to feed to a central container 84. When in the central container, the balls are inspected and normally returned back manually to the input hopper for a second pass through the system for a further attempt at flash and gate projections removal. An air cylinder 140 is actuated to pivot the diverter plate 84 between normal and reject positions as a function of the control logic of the machine as determined through the final vacuum sensing at station 6.

Overhead Transport

The overhead transport 144 is positioned for reciprocation to move between locations where a ball is picked up, then elevated, then shifted to the next cup, and then lowered and then released. The fingers 146 of the overhead transport then are elevated and shifted in anticipation of grasping the next ball. The fingers work together so that balls side by side in the adjacent rows are fed in unison.

The ball supporting fingers 146 are secured on blocks. There is a forward block 148 and a rearward block 150 for each cup 68. The blocks are supported on parallel rods 154 and 156 extending the length of the table. One of the rods 154 is secured to all forward blocks 148 and slidingly passes through all rearward blocks 150. The second rod 156 is secured to all rearward blocks 150 and is slidable through all forward blocks 148. The central section of the rod is secured by support posts 160 driven by drive rod 162 for effecting the desired raising and lowering motions. In this manner, a reciprocal air cylinder 164 at one end of the rods will effect movement of one rod toward and away from the balls. The other rod will affect a similar but opposite forward and rearward motions to forward fingers in opposition to the rearward fingers. In association with the horizontal motion, bearing members 168 lift the rods concurrently to effect their compound cycle motion.

The motor for horizontal reciprocation and the motor for vertical reciprocation are coordinated through the control mechanisms whereby the fingers 146 will move together to grasp the balls on the various cups concurrently. Then with the balls grasped, the fingers 146 and blocks 148 and 150 will raise vertically then horizontally to advance the ball to the next cup 68. The fingers and balls will then lower vertically and then separate to deposit the ball at such station. With the fingers 146 separated, the fingers and blocks will raise vertically, move rearwardly then lower downwardly to grasp the next ball in a continuous and automatic cycle of operation.

Orienting Cups

Each orienting cup 68 is formed of an upper member 170 and a lower member 172. The upper member 170 has a generally hemispherical recess 132 of size and shape to receive a ball 16 with its horizontal flash and gates disposed in contact with the upper surface 66 of the cup. Note FIG. 12. If the flash and gate projection is not oriented horizontally, the flash will raise the ball to an elevated orientation. Note FIG. 11. The lower or second block has a central aperture 76 therebeneath through which a vacuum may be drawn at station 5 as discussed above for a final sensing.

Figure 10:
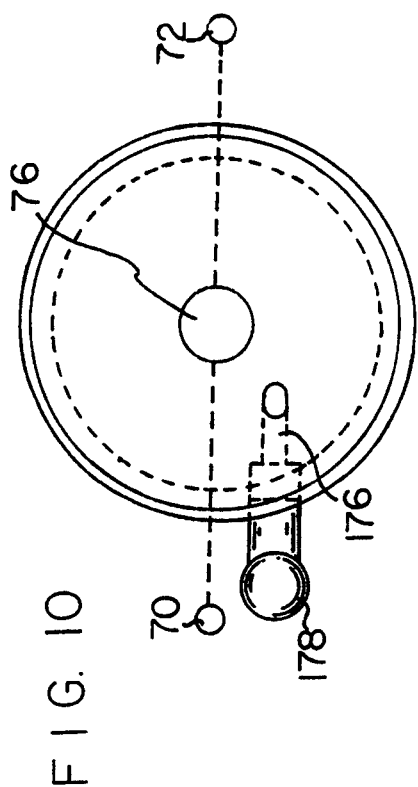
FIG. 10 is a plan view of the ball and orienting cup of FIG. 11.
Figure 12:
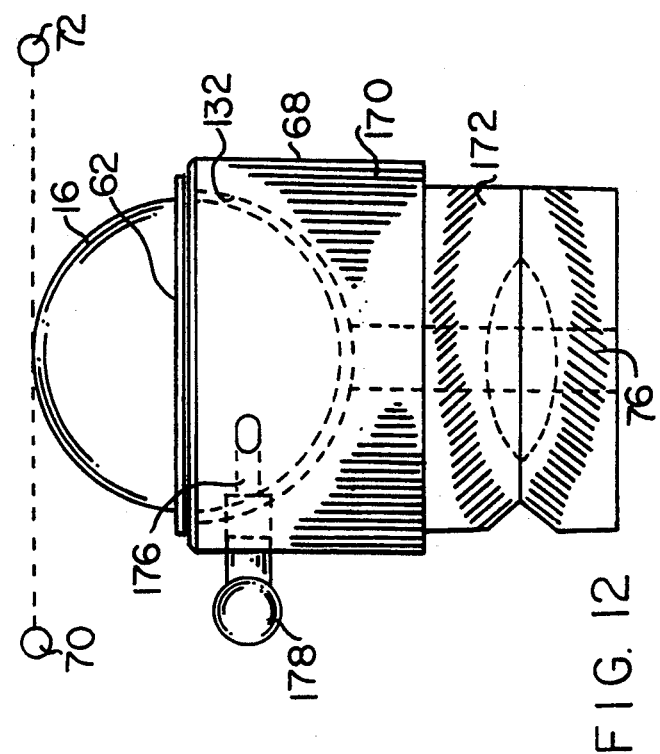

Located on one side of the upper block is a port 176 for delivering jets of air from a source 178 to the area between the ball and the hemispherical surface of the member. When provided with about five short air blasts of about 0.05 to 0.10 seconds at about 60 pounds of pressure, the flash or gate projections below the rim of the cup will be pushed upwardly out of the hemispherical space, in most instances to the proper orientation as seen in FIG. 12. When this occurs, the ball will then be seated so that the optical sensors 70, 72 can determine the low position of the ball indicating that the ball is in proper orientation for flash or gate projection removal. In the event that the final orientation is not achieved through the first sequence of air blasts at the first orienting cup, the fingers will advance the improperly oriented ball to the next cup whereat second blasts occur. If the ball has been properly seated previously, the sensor will detect such and electronically inhibit further blast sequences. If, however, seating occurs at the second or subsequent station, the cup stations thereafter will eliminate the Jet to retain the ball in proper orientation. The proper orientation is maintained while being moved by fingers to subsequent cups. The orientation of the light source and optical sensor above the cup can be seen in FIGS. 10, 11 and 12.

Milling Station

Figure 3:
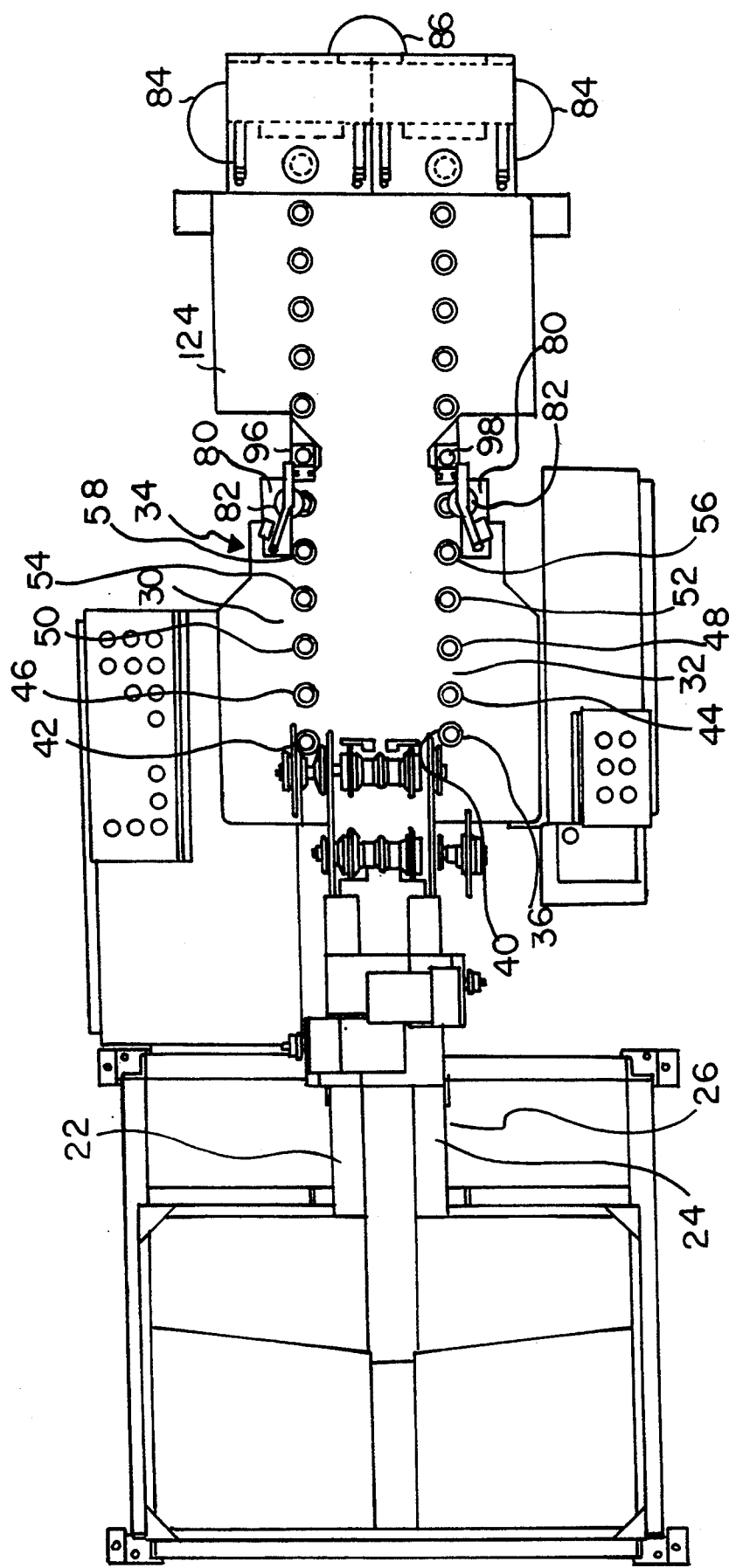
FIG. 3 is a plan view of the machine shown in FIG. 1 with parts removed to show certain internal constructions thereof.
Figure 4:
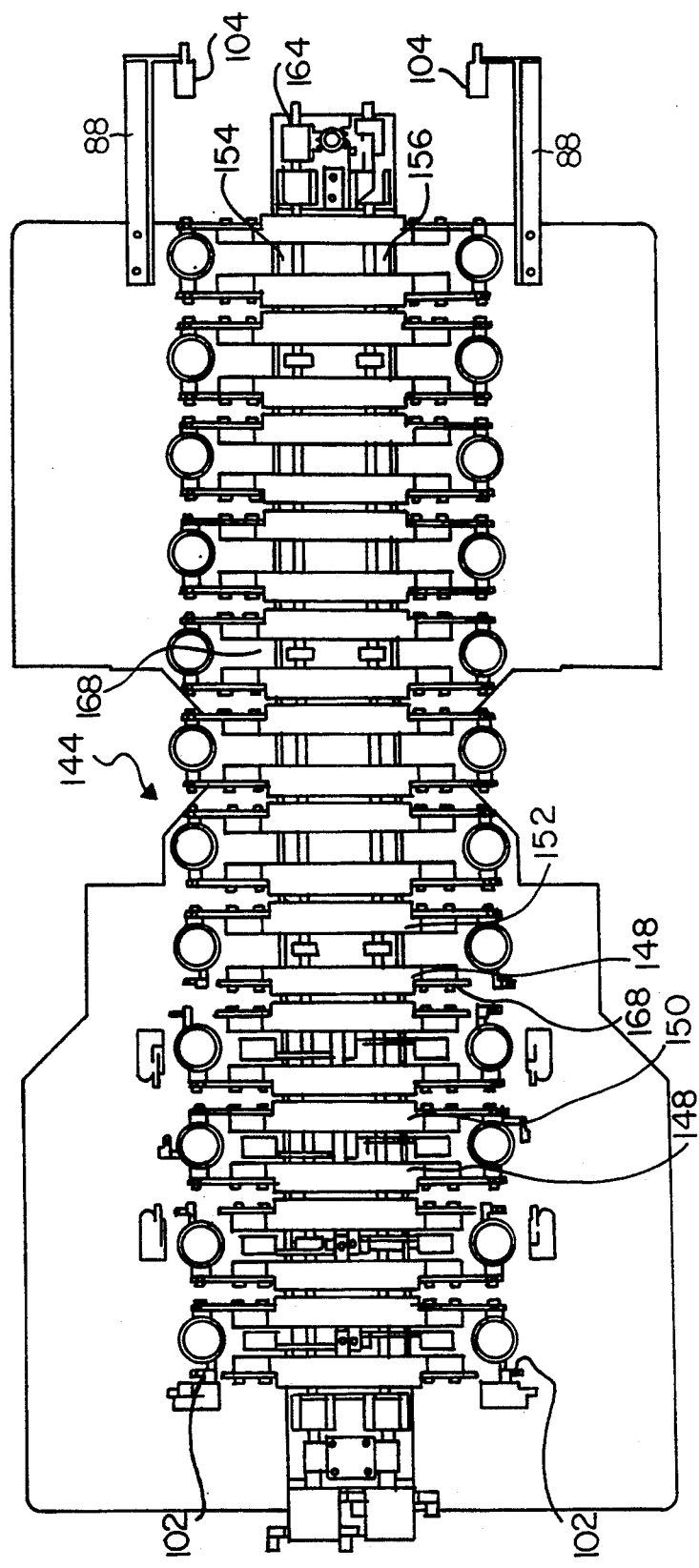
FIG. 4 is an enlarged plan view of the table portion of FIG. 3.
Figure 5:
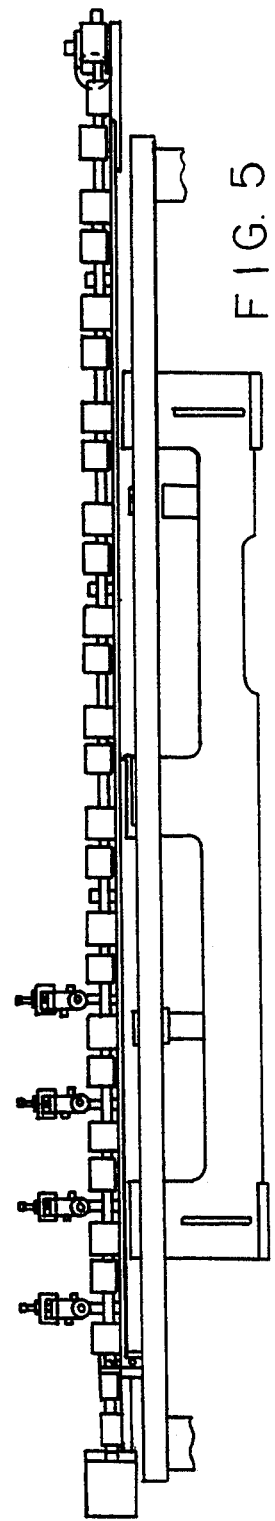
FIG. 5 is a side elevational view of the mechanisms of FIG. 4.
Figure 6:
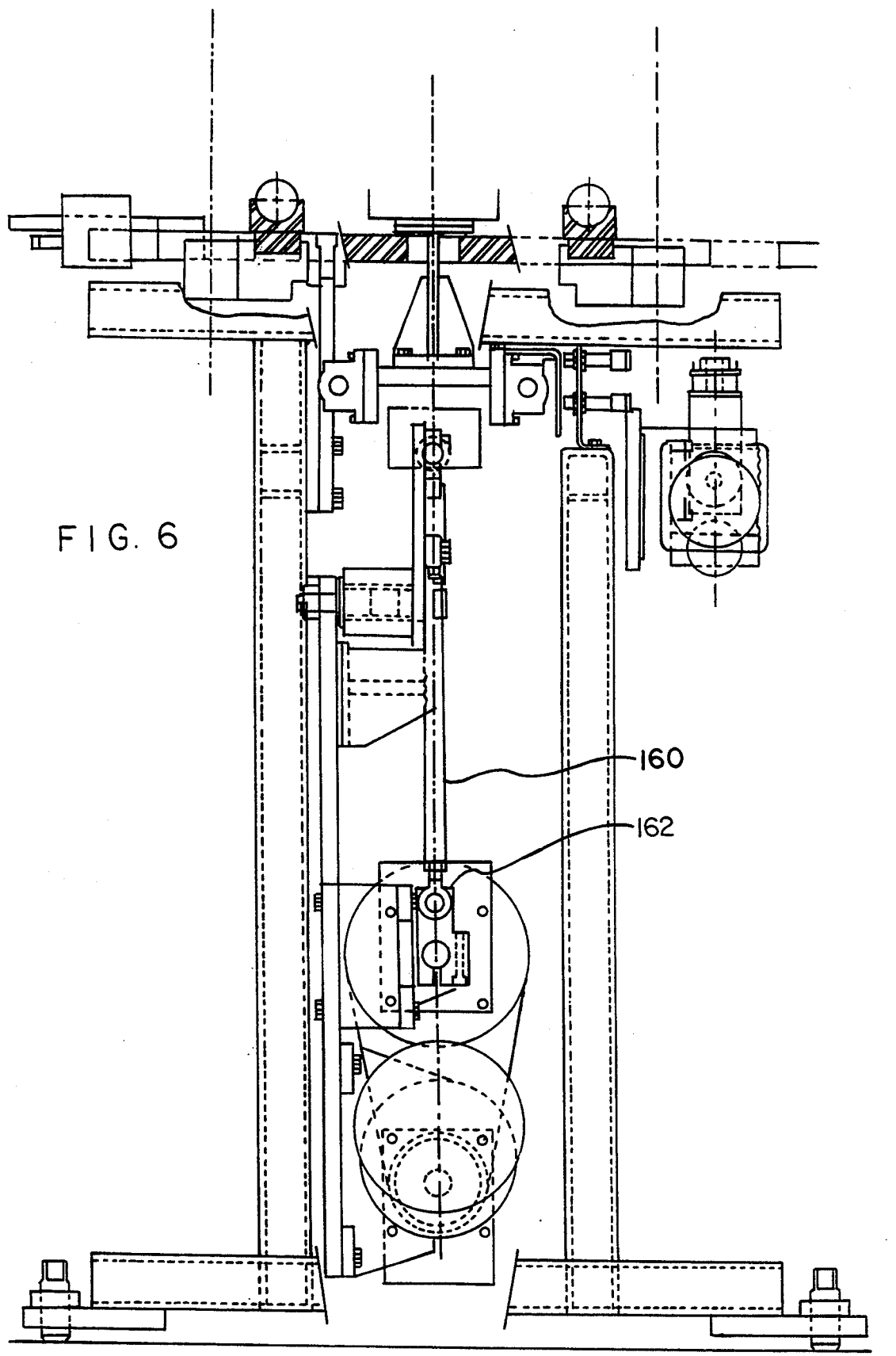
FIG. 6 is a sectional view of FIG. 4.
Figure 7:
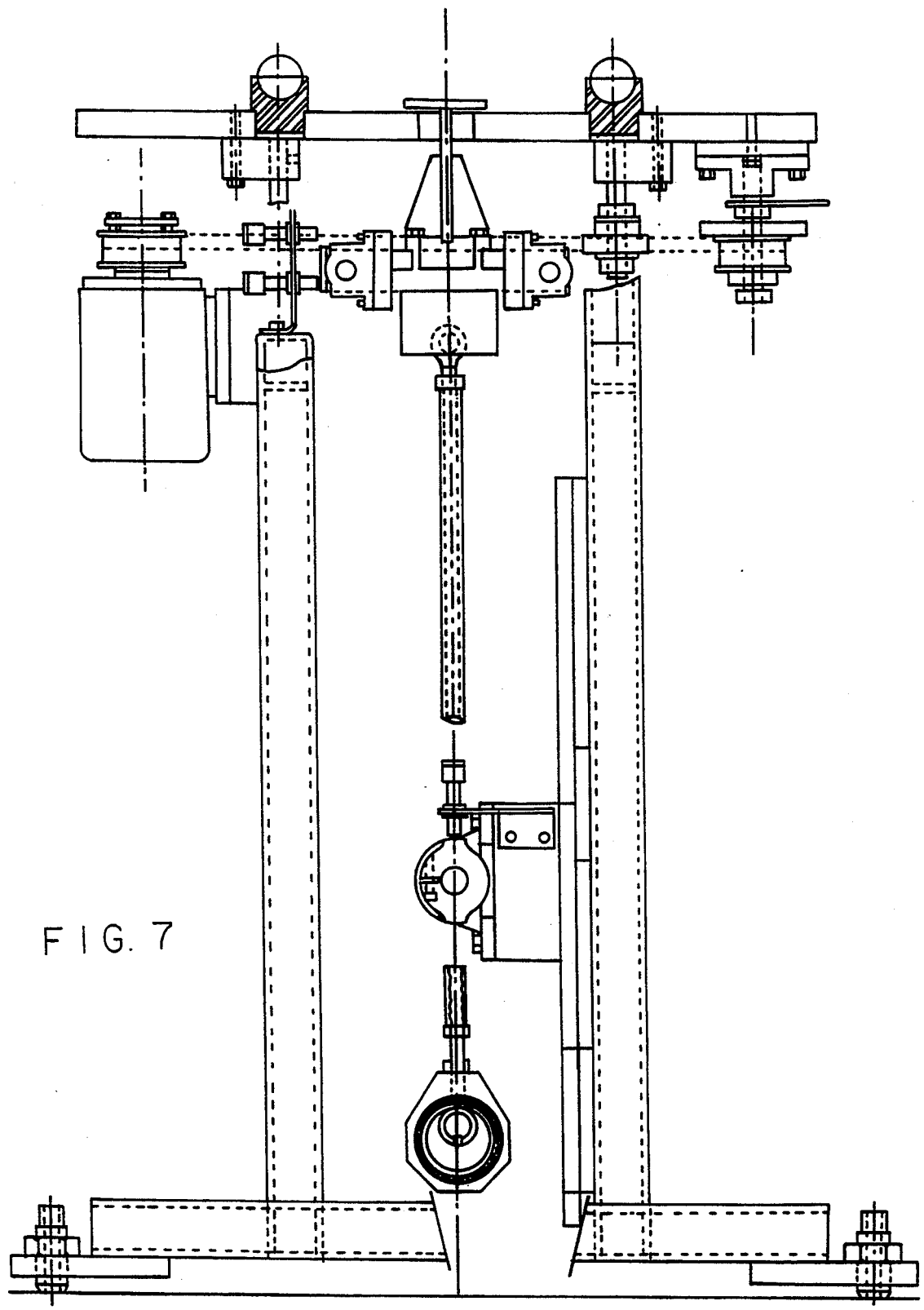
FIG. 7 is another sectional view of FIG. 4.
Figure 8:
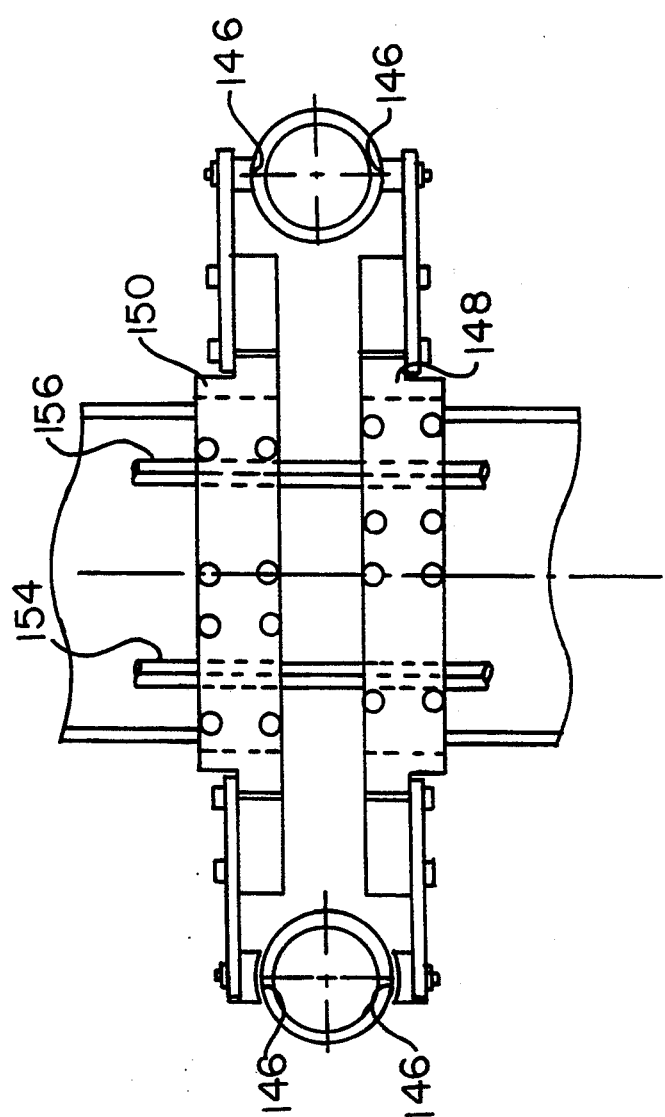
FIGS. 8 and 9 are a plan and front elevational view of one portion of the overhead transport in association with an orienting cup.
Figure 9:
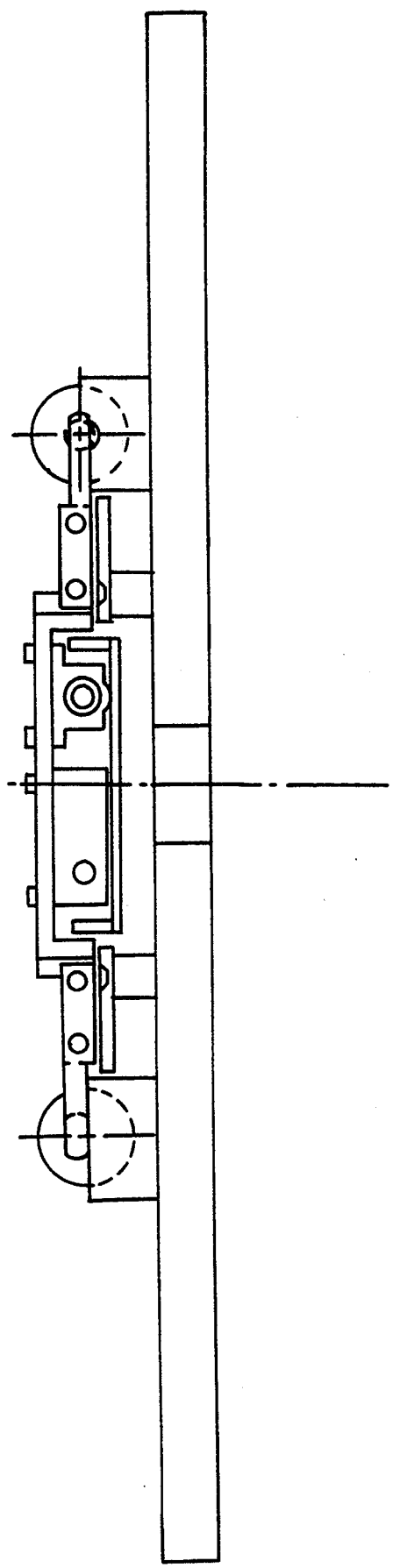

As can be seen in FIGS. 1 and 3, a milling device 80 is provided for flash and gate projection removal from balls properly oriented. If a ball is not properly oriented upon reaching the milling station, it will not be moved from its linear path of travel for flash and gate projection removal. It will, instead, proceed to the central container 84 for recycling. If, however, the ball is properly seated, an air cylinder actuated top clamp cup 182 is lowered over the ball in the seventh cup to cause a tight securement therewith. The ball is then pivoted by the support into contact with the rotating milling cutter 80 for flash and gate projection removal in the conventional manner. The upper cylinder and seventh cup are mounted for rotation about a vertical shaft through the center of the ball during milling. Power from a con, non motor rotates both balls.

The present disclosure includes that contained in the appended claims, as well as that of the foregoing description. Although this invention has been described in its preferred form with a certain degree of particularity, it is understood that the present disclosure of the preferred foregoing has been made only by way of example and that numerous changes in the details of structures and the combination and arrangement of parts may be resorted to without departing from the spirit and scope of the invention.

Now that the invention has been described,

What is claimed is:

1. Apparatus for seating a ball with excess material around its equator comprising a block with a generally hemispherical walls forming a recess facing upwardly, the recess having a diameter substantially the same as that of the ball and having a height slightly less than the radius of the ball and an aperture extending through one of the walls to provide a blast of air to the recess with a ball thereabove to thereby effect a fluttering of the ball when the air of the blast contacts the excess material in the recess, the apparatus further including control means coupled to the aperture to provide a plurality of blasts of air into the recess, the blasts each being of a duration of between 0.05 and 0.10 seconds.

2. The apparatus as set forth in claim 1 wherein the aperture is oriented to provide a blast of air into the recess which is generally tangential to the ball to be seated.

3. The apparatus as set forth in claim 1 wherein the plurality of blasts are 5 in number.

4. The apparatus as set forth in claim 1 wherein the aperture is coupled to a source of pressurized air to effect the blast of air into the recess beneath the ball to be seated.

5. Apparatus for seating a ball with excess material around its equator comprising a block with generally hemispherical walls forming a recess facing upwardly, the recess having a diameter substantially the same as that of the ball and having a height slightly less than the radius of the ball and an aperture extending through one of the walls to provide a blast of air to the recess with a ball thereabove to thereby effect a fluttering of the ball when the air of the blast contacts the excess material in the recess and further including a line extending downwardly from the recess and means to draw a vacuum through the line in the recess to determine the orientation of the ball thereabove.

6. Apparatus for seating a ball with excess material around its equator comprising a block with generally hemispherical walls forming a recess facing upwardly, the recess having a diameter substantially the same as that of the ball and having a height slightly less than the radius of the ball and an aperture extending through one of the walls to provide a blast of air to the recess with a ball thereabove to thereby effect a fluttering of the ball when the air of the blast contacts the excess material in the recess and further including sensor means adjacent to the top of a ball in the recess to determine its orientation.

7. The apparatus as set forth in claim 1 wherein the recess has an upper surface to support the excess material when the ball is seated properly.

8. Apparatus to automatically orient a golf ball for milling comprising:
 a plurality of aligned cups, each cup having a generally hemispherical recess to receive a golf ball with excess circumferential material, the cup having a circular upper surface;
 first means to move the golf balls from cup to cup;
 second means to detect the height of the golf ball in a particular cup as a function of whether excess circumferential material is in the particular cup or resting on the upper surface of the particular cup;
 third means to initiate blasts of air through an aperture in each cup when excess material is in the recess; and
 fourth means to terminate the blasts of air at cups subsequent to the particular cup if there is no excess material in the recess.

9. The apparatus as set forth in claim 8 wherein the cups are arranged in two lines side by side.

10. The apparatus as set forth in claim 8 wherein the first means includes a plurality of blocks arranged in pairs.

11. The apparatus as set forth in claim 10 and further including drive means to move the blocks both vertically and horizontally.

12. The apparatus as set forth in claim 8 wherein the second means includes optical sensors adapted to generate a beam to be blocked if the ball is improperly seated with excess material in the recess but not blocked if the golf ball is properly seated with the excess material on the upper surface of the cup.

13. The apparatus as set forth in claim 10 wherein the second means includes an optical sensor for each cup with control means to render inoperative the blasts of air at cups subsequent to a particular cup if the optical sensor at the particular cup detects a properly oriented golf ball.

14. The apparatus as set forth in claim 8 wherein the aperture is oriented to provide a blast of air into the recess which is generally tangential to the ball to be seated.

15. The apparatus as set forth in claim 14 and further including control means coupled to the aperture to provide a plurality of blasts of air into the recess.

16. The apparatus as set forth in claim 15 wherein the plurality of blasts are each of a duration of between about 0.05 and 0.10 seconds.

17. The apparatus as set forth in claim 16 wherein the plurality of blasts are 5 in number.

18. A method to automatically orient a golf ball for milling comprising:
 providing a plurality of aligned cups, each cup having a generally hemispherical recess to receive a golf ball with excess circumferential material, each cup having a circular upper surface;
 moving the golf balls from cup to cup and detecting the height of the golf ball in a particular cup as a function of whether excess circumferential material is in the particular cup or resting on the upper surface of the cup;
 initiating blasts of air when excess material is in the recess; and
 terminating the blasts of air at cups subsequent to the particular cup if there is no excess material in the recess.

* * * * *